US010792879B2

(12) United States Patent
Hara et al.

(10) Patent No.: US 10,792,879 B2
(45) Date of Patent: Oct. 6, 2020

(54) METHOD FOR MANUFACTURING PNEUMATIC TIRE

(71) Applicant: The Yokohama Rubber Co., LTD., Minato-ku, Tokyo (JP)

(72) Inventors: Yuichi Hara, Hiratsuka (JP); Hideki Seto, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 230 days.

(21) Appl. No.: 15/905,624

(22) Filed: Feb. 26, 2018

(65) Prior Publication Data

US 2018/0178469 A1   Jun. 28, 2018

Related U.S. Application Data

(63) Continuation of application No. 14/418,840, filed as application No. PCT/JP2013/067773 on Jun. 28, 2013, now abandoned.

(30) Foreign Application Priority Data

Jul. 31, 2012   (JP) ................... 2012-169230

(51) Int. Cl.
| B29D 30/30 | (2006.01) |
| B60C 5/14 | (2006.01) |
| B60C 1/00 | (2006.01) |
| B29D 30/20 | (2006.01) |
| B60C 5/12 | (2006.01) |
| B60C 9/02 | (2006.01) |
| B29D 30/06 | (2006.01) |

(52) U.S. Cl.
CPC ............ B29D 30/30 (2013.01); B29D 30/20 (2013.01); B29D 30/3007 (2013.01); B60C 1/00 (2013.01);

(Continued)

(58) Field of Classification Search
CPC .............. B29D 30/30; B60C 2005/147; B60C 2005/145

(Continued)

(56) References Cited

U.S. PATENT DOCUMENTS 2,754,887 A * 7/1956 Wykoff ................. B60C 5/14
                                                156/134
5,938,869 A * 8/1999 Kaido ................ B29D 30/0681
                                                152/510

(Continued)

FOREIGN PATENT DOCUMENTS

JP      10217350 A  *  8/1998
JP    2010149336 A  *  7/2010

(Continued)

OTHER PUBLICATIONS

ESpacenet translation of JP-2010269734-A (Year: 2019).*

(Continued)

Primary Examiner — Robert C Dye
Assistant Examiner — Alexander D Booth
(74) Attorney, Agent, or Firm — Thorpe North & Western

(57) ABSTRACT

A pneumatic tire is formed by winding a sheet member (A) and a sheet member (B) onto a molding drum and molding a cylindrical body. A laminate body (M) in which the sheet member (B) is layered in advance on the outer periphery of the sheet member (A) is wound onto a molding drum (10), the tack value of a material (a) constituting the sheet member (A) being smaller than the tack value of a material (b) constituting the sheet member (B), the length of the sheet member (A) being configured so that a starting end (As) of winding on the molding drum (10) and an ending end (Ae) of winding do not overlap, and the length of the sheet member (B) being configured so that the ending end (Be) of winding extends longer in the circumferential direction than the ending end (Ae) of winding of the sheet member (A).

18 Claims, 4 Drawing Sheets

(52) U.S. Cl.
CPC .......... *B60C 1/0008* (2013.01); *B60C 1/0041* (2013.01); *B60C 5/12* (2013.01); *B60C 5/14* (2013.01); *B60C 9/02* (2013.01); *B29D 2030/0682* (2013.01); *B60C 2001/0066* (2013.01); *B60C 2005/145* (2013.01); *B60C 2005/147* (2013.01)

(58) Field of Classification Search
USPC .......................................... 156/134; 152/450
See application file for complete search history.

(56) References Cited

U.S. PATENT DOCUMENTS

| | | | | |
|---|---|---|---|---|
| 5,992,486 | A * | 11/1999 | Katsuki | B60C 1/0008 152/510 |
| 6,966,999 | B2 * | 11/2005 | Tsou | B60C 1/0008 264/234 |
| 2009/0038729 | A1 * | 2/2009 | Soeda | B32B 25/08 152/510 |
| 2012/0118465 | A1 * | 5/2012 | Majumdar | B60C 1/0008 152/510 |

FOREIGN PATENT DOCUMENTS

| | | | | |
|---|---|---|---|---|
| JP | 2010269734 | A | * 12/2010 | |
| JP | 2011037408 | A | * 2/2011 | |
| WO | WO-2011024393 | A1 | * 3/2011 | ......... B29D 30/3007 |

OTHER PUBLICATIONS

ESpacenet translation of JP-2010149336-A (Year: 2019).*
ESpacenet translation of JP-10217350-A (Year: 2019).*
ESpacenet translation of JP-2011037408-A (Year: 2019).*

* cited by examiner

METHOD FOR MANUFACTURING PNEUMATIC TIRE

RELATED APPLICATIONS

This application is a continuation of U.S. patent application Ser. No. 14/418,840, filed on Jan. 30, 2015, which is the National Stage of International Patent Application No. PCT/JP2013/067773, filed on Jun. 28, 2013, which claims the benefit of priority from Japanese Patent Application No. 2012-169230, filed on Jul. 31, 2012.

TECHNICAL FIELD

The present technology relates to a method for manufacturing a pneumatic tire to suppress opening failure.

BACKGROUND

In a method for manufacturing a tubeless pneumatic tire, an air penetration preventing layer (inner liner) is a one-piece lining on an inner surface of the tire, and a butyl rubber having excellent impermeable properties is used as a material of the inner liner. However, the weight and large specific gravity of butyl rubber is an obstacle to weight reduction of a pneumatic tire. As a countermeasure, Japanese Unexamined Patent Application Publication No. H8-258506A proposes use of a thermoplastic resin film as the inner liner, which is thinner than butyl rubber and has higher barrier properties than butyl rubber, to achieve a greater degree of weight reduction in the tire.

Generally, when manufacturing a pneumatic tire, a sheet member formed in a band shape is wound on a tire molding drum, and a green tire is molded by overlapping and joining the ends of the sheet member. A pneumatic tire obtained by diameter-expanding and vulcanizing the obtained green tire, but diameter-expansion during tire vulcanization or stress at the time of traveling may bring about openings in the above-mentioned joint portion, thereby becoming a cause of tire failure.

This is particularly problematic when constituting the inner liner with a thermoplastic resin film, because the thermoplastic resin film has a high elastic modulus with a small adhesive force (tack value) compared to a sheet material made of butyl rubber, opening failure occurs easily.

Therefore, Japanese Unexamined Patent Application Publication No. 2009-241855A proposes layering a tie rubber layer on the outer side of the thermoplastic resin film and covering a joint portion with a reinforcing rubber sheet on the inner side of the thermoplastic resin film when overlapping and joining the ends of the laminate body in the tire radial direction. However, further improvements are sought by consumers to enhance tire durability.

SUMMARY

The present technology provides a method for manufacturing a pneumatic tire that suppresses opening failure.

A method for manufacturing a pneumatic tire of the present technology having a step for winding a sheet member A and a sheet member B onto a molding drum and forming a cylindrical body, includes: combining a sheet member A with a sheet member B so that a tack value of a material a constituting the sheet member A is smaller than a tack value of a material b constituting the sheet member B; winding, on the molding drum, a laminate body obtained by layering in advance the sheet member B on an outer periphery of the sheet member A; configuring a length of the sheet member A so that a starting end of winding of the sheet member A does not overlap with an ending end of winding of the sheet member A on the molding drum; and configuring a length of the sheet member B so that at least an ending end of winding of the sheet member B extends longer in a circumferential direction than the ending end of winding of the sheet member A, wherein the ending end of winding of the sheet member B is overlapped with and joined on an outer diameter side of a starting end of winding of the sheet member B.

In the method for manufacturing a pneumatic tire of the present technology, when the sheet member A with a small tack value is wound on the molding drum, the sheet member B with a large tack value is layered in advance, and this laminate body is wound on the molding drum in a manner to overlap and join the ends in the circumferential direction of the sheet member B in a radial direction without the end in the circumferential direction of the sheet member A overlapping the sheet member A itself during winding and by extending the ending end of winding of the sheet member B longer in the circumferential direction than the ending end of winding of the sheet member A, achieving favorable formability and enabling opening failure to be significantly suppressed.

Further, it is preferable that a plurality of the laminate bodies be overlapped and that joint portions of the respective laminate bodies be arranged so as not to overlap in a radial direction; therefore openings can be better suppressed due to that the ends of the respective members are covered by non-distal ends of the layered members having the same rigidity when being deformed due to inner pressure or the like. At this time, it is preferable that the ends of the sheet members A of the respective laminate bodies are arranged so as to be mutually separated by 10% or more of the tire circumferential length to be able to sufficiently suppress openings even when the sheet member A is formed of a material with high rigidity.

It is preferable that the material a constituting the sheet member A be a thermoplastic resin composition that includes a thermoplastic resin and an elastomer, and the thermoplastic resin be a continuous phase and the elastomer is a dispersed phase to be able to have both high barrier properties and durability. Further, it is preferable that a percentage of the elastomer be from 50 to 85 weight % when a sum of the thermoplastic resin and elastomer is 100 weight % to be able to provide the sheet member A with high durability and flexibility. It is preferable that the thermoplastic resin composition includes at least one type of thermoplastic resin selected from a polyamide resin, a polyvinyl resin, and a polyester resin to be able to obtain high barrier properties.

It is preferable that the material b constituting the sheet member B be a rubber composition consisting of at least one selected from natural rubber, isoprene rubber, styrene butadiene rubber, butadiene rubber, butyl rubber, and halogenated butyl rubber.

It is preferable that the sheet member B and the sheet member A be bonded using an adhesive composition and that the adhesive composition includes a compound represented by the following formula (1) or a condensate of the compound represented by the following formula (1) and formaldehyde to be able to favorably bond the sheet member A and the sheet member B. Alternatively, the sheet member A and the sheet member B can be directly bonded by the sheet member B containing a compound represented by the following formula (1) or a condensate of the compound represented by the following formula (1) and formaldehyde.

[Formula 1]

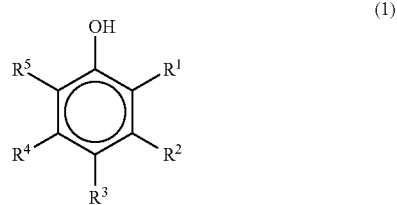

(1)

wherein, $R^1$, $R^2$, $R^3$, $R^4$ and $R^5$ are hydrogen, a hydroxyl group or an alkyl group having from 1 to 8 carbons.

It is preferable that the pneumatic tire be molded so that the end in the circumferential direction thereof inclines at an angle of from 10° and 85° relative to the tire circumferential direction to be able to better suppress openings by reducing stress generated in the joint portion.

It is preferable that a starting end of winding of the sheet member B be made to extend longer in the circumferential direction than a starting end of winding of the sheet member A to be able to easily wind around the molding drum.

In the present technology, it is preferable that a band-like member be applied on an outer periphery of the sheet member B so as to cover a joint portion of the starting end of winding and an ending end of winding of the sheet member B, and a tensile stress at the time of 20% elongation at 25° C. of a material c constituting the band-like member is from 1 to 3 times a tensile stress at the time of 20% elongation at 25° C. of the material a to be able better suppress openings.

It is preferable that the molding drum have a mechanism for adhering the sheet member A to a portion of a drum surface to be able to easily wind around the molding drum even if the starting end of winding of the sheet member B is in the same position as the starting end of winding of the sheet member A.

It is preferable that the sheet member A be an inner liner to be able to reduce weight of the inner liner and to significantly suppress opening failure.

It is preferable that the joint portion of the laminate body and a joint portion of a carcass layer overlap in a radial direction when the laminate body is wound on the molding drum and the carcass layer is wound on the outer periphery of the laminate body to be able to better suppress openings due to the rigidity of the carcass layer.

It is preferable that after the sheet member A undergoes biaxial oriented processing, the sheet member B be layered on the outer periphery of the sheet member A to be able to provide the sheet member A with high barrier, high strength, and uniform physical properties.

A pneumatic tire obtained according to any of the methods for manufacturing described above can suppress opening failure.

DETAILED DESCRIPTION

Figure 1:
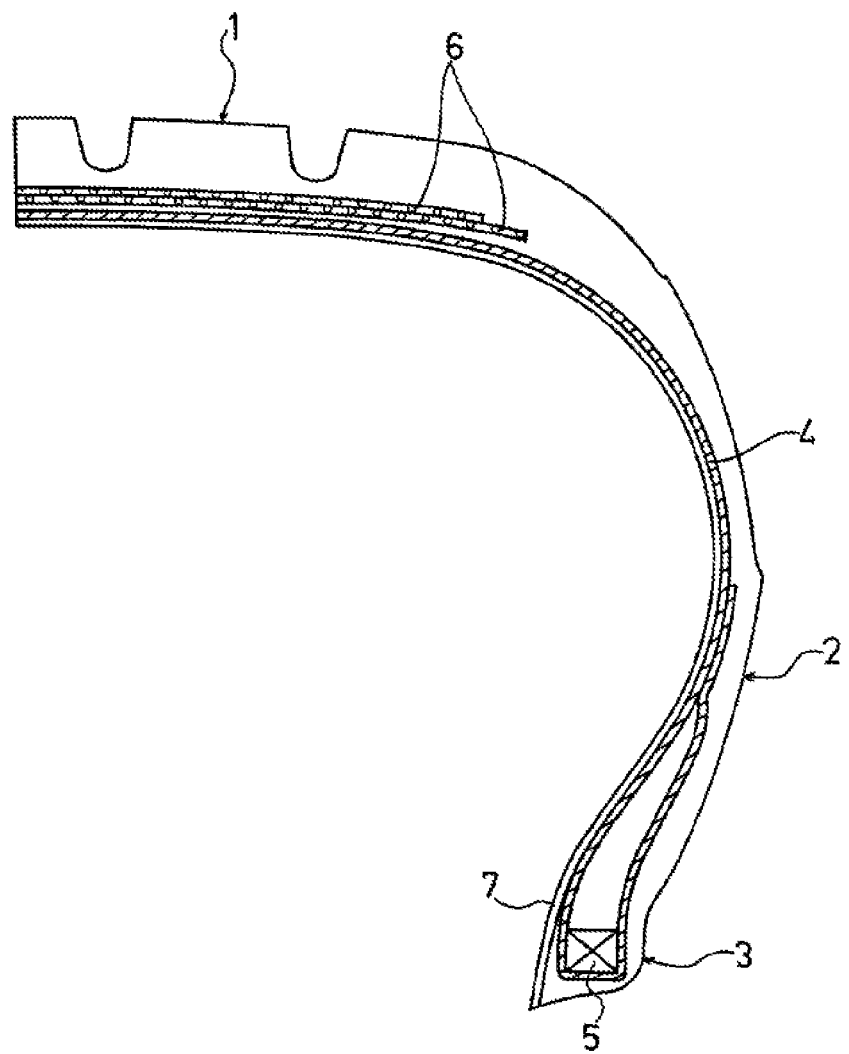
FIG. 1 is a half-cross-sectional view of a tire meridian direction illustrating one example of an embodiment of a pneumatic tire manufactured by the present technology.

FIG. 1 is a half-cross-sectional view of a tire meridian direction illustrating one example of a pneumatic tire manufactured by the present technology.

In FIG. 1, a pneumatic tire has a tread portion 1, a side wall portion 2, and a bead portion 3. A carcass layer 4 is laid across a pair of left and right bead cores 5 buried in the bead portion 3, and each of the both ends of the carcass layer 4 is folded around the bead core 5 from an inner side to an outer side of the tire. In the tread portion 1, a pair of upper and lower belt layers 6 are arranged along an entire periphery of the tire on an outer side of the carcass layer 4, and an inner liner 7 is lined on the inner side of the carcass layer 4.

In the method for manufacturing a pneumatic tire of the present technology, when forming a cylindrical body by winding a sheet member A having a small tack value and a sheet member B having a large tack value on a molding drum, a laminate body is formed by layering the sheet member A and the sheet member B in advance, and this laminate body is wound on the molding drum. At this time, mutual ends in the circumferential direction of the sheet member B are overlapped and joined in a radial direction without the ends in the circumferential direction of the sheet member A overlapping the sheet member A itself and by configuring the length of the sheet member B so that at least ending end of winding extends longer in the circumferential direction than the ending end of winding of the sheet member A. In the following description, an inner liner will be used as an example of the sheet member A and a tie rubber layer (not illustrated) will be used as an example of the sheet member B. Note that the sheet member A is not limited to an inner liner and that another sheet member having a low tack value may be applied.

In the present technology, the sheet member A is formed of the material a and the sheet member B is formed of the material b. Further, a tack value of the material a is smaller than a tack value of the material b. Here, the tack value of the material a and the tack value of the material b are self-adhesive tack values, and these self-adhesive tack values are measured using a pickup type tack tester under the conditions of a test temperature of 25° C., compression bonding load of 100 g, compression bonding time of 10 seconds, compression bonding rate of 50 cm/min, and a peeling rate of 125 cm/min. A test piece is formed by one of these materials having a width between 10 mm and 12 mm being wound to a jig on the tester while the other is made into a band-like shape and used as a backing. The tester jig having the test piece wound thereon is secured to a platform and drop, compression, and lift were conducted based on the above conditions. A tack value between the material a and the material b is described below.

Figure 2:
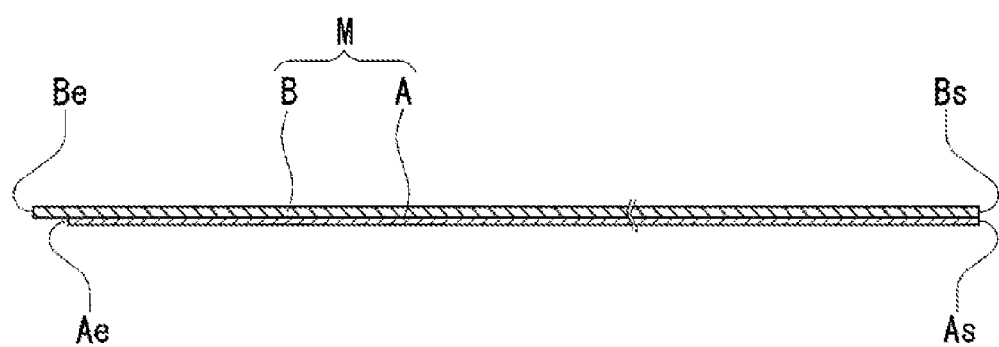
FIG. 2 is a cross-sectional view schematically illustrating one example of an embodiment of a laminate body used in a method for manufacturing a pneumatic tire of the present technology.

FIG. 2 is a cross-sectional view schematically illustrating one example of an embodiment of a laminate body used in the present technology.

As illustrated in FIG. 2, a laminate body M is made by layering and bonding in advance the sheet member B having a large tack value on the outer peripheral side of the sheet member A having a small tack value. The entire lengths, as illustrated in FIG. 2, are different between the sheet member A and the sheet member B with the entire length of the sheet member B being longer. The entire length of the sheet member A when wound onto the molding drum is determined so that both ends As and Ae do not overlap.

The laminate body M illustrated in FIG. 2 has the starting end As of winding of the sheet member A and the starting end Bs of winding of the sheet member B aligned substantially flush with each other. Meanwhile, the ending end Be of winding of the sheet member B extends longer to the outer side than the ending end Ae of winding of the sheet member A.

Figure 3:
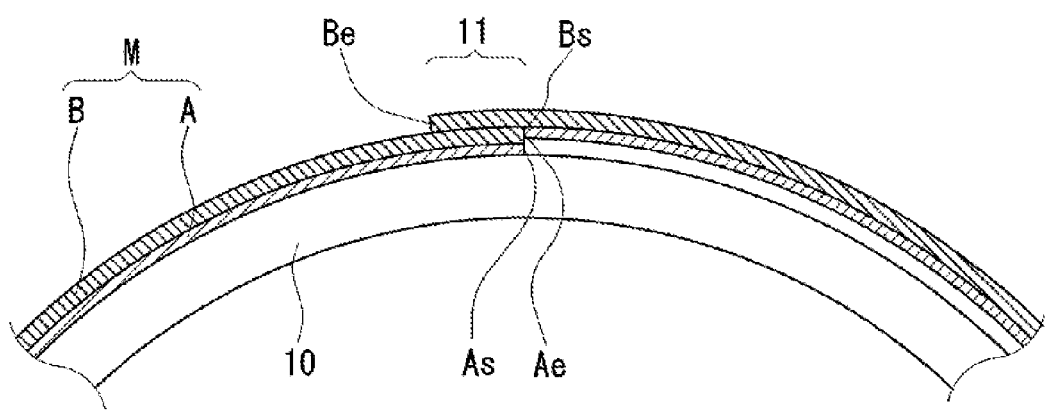
FIG. 3 is a cross-sectional view schematically illustrating one example of an embodiment where the laminate body of FIG. 2 is wound onto a molding drum in a method for manufacturing a pneumatic tire of the present technology.

FIG. 3 is a cross-sectional view schematically illustrating an embodiment of a joint portion when the laminate body M is wound onto the molding drum.

In FIG. 3, the laminate body M constituted by the sheet member A and the sheet member B on the outer periphery of the molding drum 10 is wound so that the sheet member A is in contact with the surface of the molding drum 10. The sheet member A is wound one time around the molding drum 10, and the ending end Ae of winding thereof is butted against the starting end As of winding. Meanwhile, the sheet member B is wound one time around the molding drum 10 on the outer peripheral side of the sheet member A, and the ending end Be of winding thereof is overlapped with and joined on the outer side of the starting end Bs of winding. In the present technology, a region where the starting end Bs of winding and the ending end Be of winding of the sheet member B radially overlap makes a joint portion 11.

As described above, with the method for manufacturing of the present technology, the ending end Ae of winding of the sheet member A does not overlap with either the starting end As of winding of the sheet member A or the starting end Bs of winding of the sheet member B. This way, both ends As and Ae of the sheet member A are not involved in the joint of the laminate body M, and only both ends Bs and Be of the sheet member B are overlapped and joined in a radial direction to thereby enable opening failure to be significantly suppressed.

Figure 4:
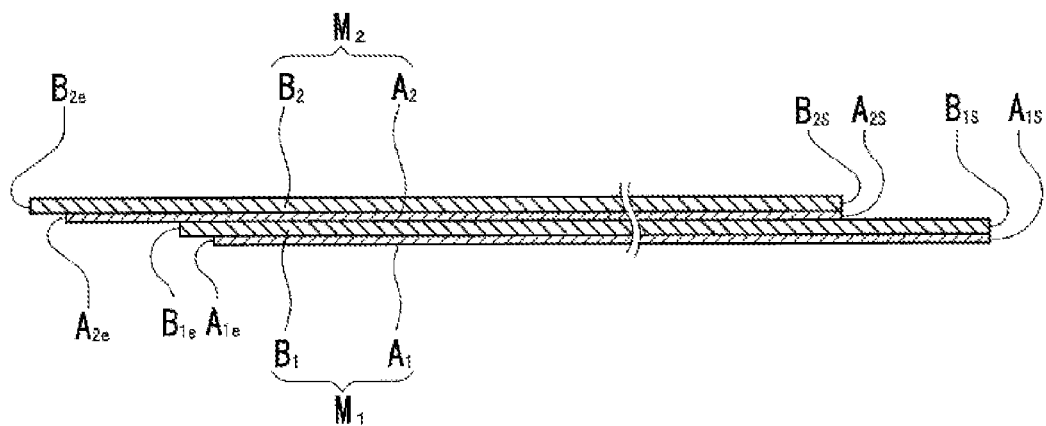
FIG. 4 is a cross-sectional view schematically illustrating one example of another embodiment of a laminate body used in a method for manufacturing a pneumatic tire of the present technology.

For the laminate body used in the present technology as illustrated in FIG. 4, a plurality of the laminate bodies may be overlapped with each other. FIG. 4 is an example of layering and bonding in advance another laminate body M2 on the outer side of one laminate body M1. The example in FIG. 4 illustrates two layers constituted by the laminate bodies M1, M2, but the number of laminate bodies may be three or four as long as the number is plural.

In FIG. 4, the laminate body M1 and the laminate body M2 are each identical to the laminate body M illustrated in FIG. 2 and are differentiated by the reference numerals 1 and 2. The laminate body M1 and the laminate body M2 that have been shifted from each other in the length direction (circumferential direction of the molding drum) are layered and bonded, and when wound onto the molding drum, the joint portion (region where the starting end B1s of winding and the ending end B1e of winding of the sheet member B1 overlap in a radial direction) of the laminate body M1 and the joint portion (region where the starting end B2s of winding and the ending end B2e of winding of the sheet member B2 overlap in a radial direction) of the laminate body M2 are arranged so as not to overlap in a radial direction. By preventing the joint portions of the laminate bodies M1 and M2 from overlapping with each other on the inner and outer sides in the radial direction, when the joint portions deform due to inner-pressure and the like, openings can be greatly suppressed due to that the joint portions are covered by the respective non-distal ends of M1 and M2 having the same rigidity.

Further, with each of the laminate bodies M1 and M2, the distance between the ends A1s and A2s of the respective sheet members A is preferably 10% or more of the tire circumference length. For example, a distance between the ends A1s and A2s of the sheet members A may be 50% of the tire circumferential length. Making the distance between the ends of the sheet members A to be 10% or more of the tire circumferential length allows stress in the joint portion to be better dispersed, thereby suppressing openings. Further, when layering three laminate bodies M in advance, a distance between the ends of the sheet members A is preferably 10% or more of the tire circumferential length between adjacent laminate bodies. More specifically, the starting end of winding of the sheet member A may be arranged uniformly (coordination angle from the tire center is approximately 120°) on the periphery. In order to make an arrangement so that a distance d is 10% or more of the tire circumferential length in this manner, the distance d between the starting ends of winding of the sheet members A may be made to be 10% or more of one circumferential length of the molding drum during green molding of the tire.

Figure 5:
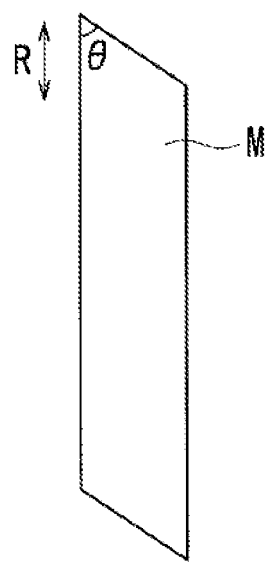
FIG. 5 is a plan view schematically illustrating one example of an embodiment of a laminate body used in a method for manufacturing a pneumatic tire of the present technology.

The laminate body M used in the present technology, as illustrated in FIG. 5, preferably has the end in the circumferential direction R thereof extending inclined in the tire width direction (axial direction of the molding drum), and in addition, an angle θ formed by the extending direction of the end in the circumferential direction R and the tire circumferential direction is preferably from 10° to 85°. When the angle θ is within the range of 10° to 85°, the stress in the joint portion of the laminate body M is relaxed allowing opening failure to be further reduced.

Figure 6:
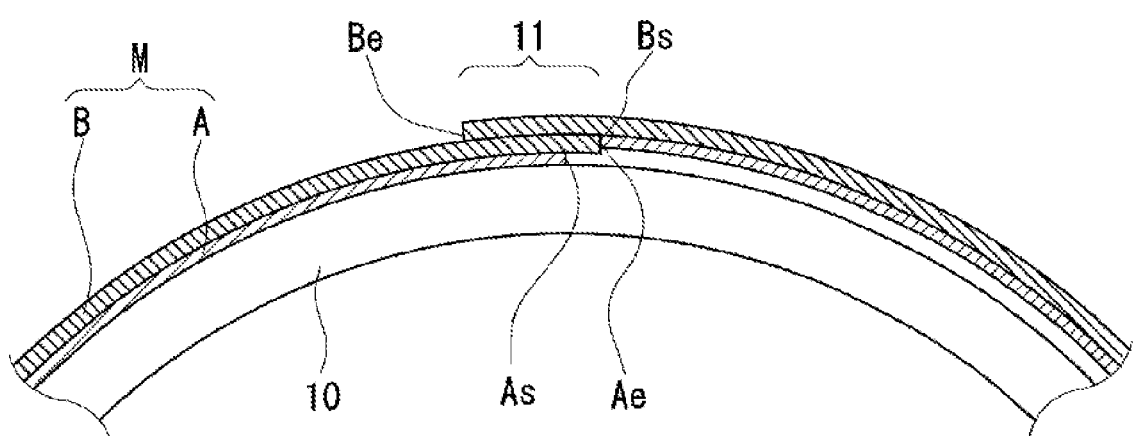
FIG. 6 is a cross-sectional view schematically illustrating one example of another embodiment where the laminate body is wound on a molding drum in a method for manufacturing a pneumatic tire of the present technology.

Moreover, the laminate body M, as illustrated in FIG. 6, is allowed to have the starting end Bs of winding of the sheet member B extending longer in the circumferential direction than the starting end As of winding of the sheet member A, i.e., the starting end Bs of winding of the sheet member B is allowed to project outside in the circumferential direction from the starting end As of winding of the sheet member A. In this manner, extending the starting end Bs of winding of the sheet member B longer in the circumferential direction than the starting end As of winding of the sheet member A can achieve an effect of easier winding on the molding drum.

In the present technology, it is preferable that the material a that constitutes the sheet member A be a thermoplastic resin composition. Furthermore, it is preferable that the material b that constitutes the sheet member B be a rubber composition.

The material a made up of the thermoplastic resin composition has a small tack value, and the material b made up of the rubber composition has a large tack value. The tack value of the material a used in the present technology is smaller than the tack value of the material b.

The tack value of the material a is not particularly limited as long as the tack value is smaller than the tack value of the material b, but the self-adhesive tack value at 25° C. for 10 seconds is preferably 100 g or less. Further, for the tack value of the material b, the self-adhesive tack value at 25°

C. for 10 seconds is preferably from 200 g to 3000 g. Furthermore, the tack value of the material a relative to the material b is preferably from 500 g to 2000 g. Here, the tack value of the material a to the material b measured using a pickup type tack tester under the conditions of a test temperature of 25° C., compression bonding load of 100 g, compression bonding time of 10 seconds, compression bonding rate of 50 cm/min, and a peel rate of 125 cm/min. A test piece composed of material b having a width between 10 mm and 12 mm is wound to a jig on the tester while a test piece composed of material a is made into a band-like shape and used as a backing. The tester jig having the test piece wound thereon is secured to a platform and drop, compression, and lift were conducted based on the above conditions.

Further, the tensile stresses at the time of 20% elongation at 25° C. of material a and material b are preferred when the tensile stress at the time of 20% elongation of the material a is greater than the tensile stress at the time of 20% elongation of the material b. Particularly, the tensile stress at the time of 20% elongation of the material a is preferably from 3 to 100 times the tensile stress at the time of 20% elongation of the material b. When the tensile stress at the time of 20% elongation of the material a is from 3 to 100 times that of the material b, the material a can be made to have excellent barrier properties and heat resistance. The tensile stress at the time of 20% elongation at 25° C. of the material a and the material b are measured in accordance with JIS K-6251.

In the present technology, it is preferable that the thermoplastic resin composition constituting the sheet member A be a composition that includes a thermoplastic resin and/or an elastomer, and it is more preferable that the composition includes a thermoplastic resin and an elastomer. Composing the thermoplastic resin composition in this manner allows air permeation preventive properties and rigidity of the sheet member A to be adjusted Further, it is preferable that the morphology of the thermoplastic resin composition be such that the thermoplastic resin is a continuous phase and that the elastomer is a dispersed phase so as to be able to have both high barrier properties and high durability.

Further, it is preferable that a percentage of the elastomer be from 50 to 85 weight % and that the thermoplastic resin be from 50 to 15 weight % when a sum of the thermoplastic resin and elastomer is 100 weight % so as to be able to obtain favorable durability with flexibility.

Examples of thermoplastic resins composing the thermoplastic resin composition that may be preferably used include polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer) and N-alkoxyalkylates thereof (for example, methoxy methylate of nylon 6, methoxy methylate of nylon 6/610 copolymer, and methoxy methylate of nylon 612), polyester resins (for example, aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, and polyoxyalkylene diimidic acid/polybutylene terephthalate copolymer), polynitrile resins (for example, polyacrylonitrile (PAN), polymethacrylonitrile, acrylonitrile/styrene copolymer (AS), (meth) acrylonitrile/styrene copolymer, and (meth) acrylonitrile/styrene/butadiene copolymer), polymethacrylate resins (for example, polymethylmethacrylate (PMMA) and polyethylmethacrylate), polyvinyl resins (for example, vinyl acetate, polyvinyl alcohol (PVA), vinyl alcohol/ethylene copolymer (EVOH), polyvinylidene chloride (PDVC), polyvinyl chloride (PVC), vinyl chloride/vinylidene chloride copolymer, vinylidene chloride/methylacrylate copolymer, and vinylidene chloride/acrylonitrile copolymer), cellulose resins (for example, cellulose acetate and cellulose acetate butyrate), fluorine resins (for example, polyvinylidene fluoride (PVDF), polyvinyl fluoride (PVF), polychlorofluoroethylene (PCTFE), and tetrafluoroethylene/ethylene copolymer (ETFE)), imide resins (for example, aromatic polyimide (PI)); and the like. It is preferable that the at least one type of thermoplastic resin selected from a polyamide resin, a polyvinyl resin, and a polyester resin be included so as to be able to provide favorable barrier properties and heat resistance.

Examples of elastomers composing the thermoplastic elastomer composition that may be preferably used include diene rubbers and hydrogenated products thereof (for example, natural rubber (NR), isoprene rubber (IR), epoxidized natural rubber, styrene butadiene rubber (SBR), butadiene rubber (BR, high-cis BR and low-cis BR), nitrile rubber (NBR), hydrogenated NBR, and hydrogenated SBR), olefin rubbers (for example, ethylene propylene rubber (EPDM, EPM), maleated ethylene propylene rubber (M-EPM), butyl rubber (IIR), isobutylene and aromatic vinyl or diene monomer copolymer, acrylic rubber (ACM), and ionomer), halogen-containing rubbers (for example, Br-IIR, Cl-IIR, brominated copolymer of isobutylene/paramethyl styrene (Br-IPMS), chloroprene rubber (CR), chlorohydrin rubber (CHR), chlorosulfonated polyethylene rubber (CSM), chlorinated polyethylene rubber (CM), and maleated chlorinated polyethylene rubber (M-CM)), silicone rubbers (for example, methyl vinyl silicone rubber, di-methyl silicone rubber, and methyl phenyl vinyl silicone rubber), sulfur-containing rubbers (for example, polysulfide rubber), fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers), thermoplastic elastomers (for example, styrene elastomers such as styrene-butadiene-styrene triblock polymer (SBS) and hydrogenated products thereof (SEBS), styrene-isoprene-styrene triblock polymer (SIS) and hydrogenated products thereof (SEPS), styrene-isobutylene-styrene triblock polymer (SIBS), olefin elastomers, ester elastomers, polyamide elastomers, polyamide and polyether copolymer (TPAE), polyester and polyether copolymer (TPEE), urethane elastomers (TPU)), and the like.

A composition ratio between the thermoplastic resin and the elastomer in the thermoplastic resin composition is not particularly limited, but an elastomer in a matrix of the thermoplastic resin may be appropriately determined so as to establish a dispersed structure as a discontinuous phase. A preferable range for a weight ratio of the elastomer/thermoplastic resin is from 90/10 to 30/70, and more preferable is from 85/15 to 50/50. By forming the thermoplastic resin composition with the thermoplastic resin as the continuous phase (matrix), and the elastomer as the dispersed phase (domain), the sheet member A can be given both sufficient flexibility and rigidity, and it is possible to obtain the same processability as thermoplastic resin when forming, regardless of the quantity of elastomer.

If the thermoplastic resin described above is incompatible with such an elastomer, a compatibilizer may be used as a third component appropriately to make the two compatible with each other. By mixing a compatibilizer, the interfacial tension between the thermoplastic resin composition and the elastomer is reduced and the rubber particles constituting the dispersion phase is made finer, so that both components can exhibit their characteristics more effectively. In general, such a compatibilizer has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. These may be selected based on the type of thermoplastic resin and elastomer that are mixed. Examples typically used include maleic anhydride-modified polypropylene, maleic anhydride-modified ethylene-ethylacrylate copolymer, an epoxy-modified ethylene-methacrylate copolymers, epoxy-modified styrene-butadiene-styrene copolymer, a styrene/ethylene-butylene block copolymer (SEBS) and a maleated form thereof, EPDM, EPDM/styrene or EPDM/acrylonitrile graft copolymer and a maleated form thereof, styrene/maleic acid copolymer, reactive phenoxy resin, and the like. The compound amount of the compatibilizer is not particularly limited, but preferably is from 0.5 to 20 parts by weight per 100 parts by weight of the polymer component (the sum of the thermoplastic resin and the elastomer component). Further, according to this compatibilizer, the rubber particle size of the dispersed phase is preferably 10 μm or less, more preferably 5 μm or less, and particularly preferred to be from 0.1 to 2 μm.

In the present technology, fillers (calcium carbonate, titanium oxide, alumina, and the like) that are generally blended in polymer compositions, carbon black, reinforcing agents such as white carbon or the like, softeners, plasticizers, processing aids, pigments, dyes, antiaging agents, and the like can be added as desired to the thermoplastic resin composition, provided properties that are necessary for the sheet member A do not deteriorate.

In the manufacturing method of the present technology, the material b composing the sheet member B is preferably a rubber composition. This rubber composition may be blended of at least one selected from natural rubber, isoprene rubber, styrene butadiene rubber, butadiene rubber, butyl rubber, and halogenated butyl rubber.

In the present technology, the sheet member B and the sheet member A are preferably bonded by an adhesive composition. The adhesive composition preferably includes a compound represented by the following formula (1) or a condensate of the compound represented by the following formula (1) and formaldehyde to be able to favorably bond the sheet member A and the sheet member B. Alternatively, the sheet member A and the sheet member B can be directly bonded by the sheet member B containing a compound represented by the following formula (1) or a condensate of the compound represented by the following formula (1) and formaldehyde.

[Formula 2]

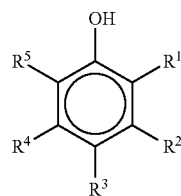

(1)

(In the formula, $R^1$, $R^2$, $R^3$, $R^4$ and $R^5$ are hydrogen, a hydroxyl group or an alkyl group having from 1 to 8 carbons)

In a preferable example of a compound represented by formula (1), at least one of $R^1$, $R^2$, $R^3$, $R^4$, and $R^5$ is an alkyl group having from 1 to 8 carbons, and the others are hydrogens or alkyl groups having from 1 to 8 carbons. A specific preferable example of a compound represented by formula (1) is cresol.

In a preferable example of a compound represented by formula (1), at least one of $R^1$, $R^2$, $R^3$, $R^4$, and $R^5$ is a hydroxyl group, and the others are hydrogens or alkyl groups having from 1 to 8 carbons. Another specific preferable example of a compound represented by formula (1) is resorcin.

Examples of a condensate of a compound represented by formula (1) and formaldehyde include a cresol/formaldehyde condensate, a resorcin/formaldehyde condensate, and the like. These condensates may be modified to the extent that the effects of the present technology are not disturbed. For example, a modified resorcin/formaldehyde condensate modified by an epoxy compound can be utilized in the present technology. Such condensates are commercially available, and the commercial products can be utilized in the present technology.

In the manufacturing method of the present technology, it is preferable that a band-like member be applied on the outer periphery of the sheet member B so as to cover the joint portion of the starting end Bs of winding and the ending end Be of winding. For the material c composing the band-like member, it is preferable that a tensile stress at the time of 20% elongation at 25° C. of the material c be from 1 to 3 times the tensile stress at the time of 20% elongation at 25° C. of the material a composing the sheet member A. Making the tensile stress at the time of 20% elongation at 25° C. of the material c to be 1 to 3 times the tensile stress at the time of 20% elongation at 25° C. of the material a enables openings to be suppressed. The tensile stresses at the time of 20% elongation at 25° C. of the material a and material c are measured in accordance with JIS K-6251.

As this type of material c, a composite resin with an elastomer can be exemplified.

In the manufacturing method of the present technology, it is preferable that the molding drum has a mechanism for adhering the sheet member A having a small tack value to a portion of the drum surface. When the molding drum has an adhering mechanism, winding the laminate body M on the molding drum so as to bring the sheet member A into contact with the molding drum becomes easier. As this type of adhering mechanism, a vacuum mechanism using air can be exemplified.

In the manufacturing method of the present technology, when the laminate body is wound on the molding drum and another sheet member, for example a carcass layer, is wound on the outer periphery of the laminate body, the joint portion of the laminate body and the joint portion of the carcass layer preferably overlap in the radial direction on the molding drum. Overlapping the joint portion of the laminate body and the joint portion of the carcass layer in the radial direction increases rigidity in the joint portions and suppresses openings.

The sheet member A used in the present technology preferably undergoes biaxial oriented processing prior to layering and bonding of the sheet member B. Performing biaxial oriented processing on the sheet member A in advance enables a high barrier, high strength, and uniform physical properties.

A pneumatic tire manufactured according to the manufacturing method of the present technology can suppress openings during travel and improve durability.

What is claimed is:

1. A method for manufacturing a pneumatic tire having a step for winding a sheet member (A) and a sheet member (B) onto a molding drum and molding a cylindrical body, the sheet member (A) being an inner liner and the sheet member (B) being a tie rubber layer, the method comprising the steps of:
combining the sheet member (A) with the sheet member (B), wherein a tack value of a material (a) constituting the sheet member (A) is smaller than a tack value of a material (b) constituting the sheet member (B);
winding, on the molding drum, a laminate body obtained by layering in advance the sheet member (B) on an outer periphery of the sheet member (A), wherein the laminate body is wound on the molding drum such that sheet member (A) is in contact with the molding drum;
configuring a length of the sheet member (A) so that a starting end of winding of the sheet member (A) does not overlap with an ending end of winding of the sheet member (A) on the molding drum;
configuring a length of the sheet member (B) so that at least an ending end of winding of the sheet member (B) extends longer in a circumferential direction of the molding drum than the ending end of winding of the sheet member (A); and
winding a carcass layer on an outer periphery of the laminate body such that the tie layer is between the inner liner and the carcass layer; wherein
the ending end of winding of the sheet member (B) is overlapped with and joined on an outer diameter side of a starting end of winding of the sheet member (B); and
the starting end of winding of the sheet member (B) is made to extend longer in the circumferential direction than the starting end of winding of the sheet member (A).

2. The method for manufacturing a pneumatic tire according claim 1, wherein a plurality of the laminate bodies are overlapped and wound on the molding drum, and joint portions of the respective laminate bodies are arranged so as not to overlap in a radial direction.

3. The method for manufacturing a pneumatic tire according claim 2, wherein end portions of sheet members (A) of the respective laminate bodies are arranged so as to be mutually separated by 10% or more of a tire circumferential length.

4. The method for manufacturing a pneumatic tire according to claim 3, wherein the material (a) is a thermoplastic resin composition including a thermoplastic resin and an elastomer, and the thermoplastic resin is a continuous phase and the elastomer is a dispersed phase.

5. The method for manufacturing a pneumatic tire according to claim 4, wherein the elastomer is from 50 to 85 weight % when a sum of the thermoplastic resin and elastomer is 100 weight %.

6. The method for manufacturing a pneumatic tire according to claim 5, wherein the thermoplastic resin composition includes at least one type of thermoplastic resin selected from a polyamide resin, a polyvinyl resin, and a polyester resin.

7. The method for manufacturing a pneumatic tire according claim 1, wherein a plurality of the laminate bodies are overlapped and wound on the molding drum, and end portions of sheet members (A) of the respective laminate bodies are arranged so as to be mutually separated by 10% or more of a tire circumferential length.

8. The method for manufacturing a pneumatic tire according to claim 1, wherein the material (a) is a thermoplastic resin composition including a thermoplastic resin and an elastomer, and the thermoplastic resin is a continuous phase and the elastomer is a dispersed phase.

9. The method for manufacturing a pneumatic tire according to claim 8, wherein a percentage of the elastomer is from 50 to 85 weight % when a sum of the thermoplastic resin and the elastomer is 100 weight %.

10. The method for manufacturing a pneumatic tire according to claim 8, wherein the thermoplastic resin composition includes at least one type of thermoplastic resin selected from a polyamide resin, a polyvinyl resin, and a polyester resin.

11. The method for manufacturing a pneumatic tire according to claim 1, wherein the material (b) is a rubber composition consisting of at least one selected from natural rubber, isoprene rubber, styrene butadiene rubber, butadiene rubber, butyl rubber, and halogenated butyl rubber.

12. The method for manufacturing a pneumatic tire according to claim 1, wherein the sheet member (B) and the sheet member (A) are bonded using an adhesive composition, and the adhesive composition includes a compound represented by formula (1) below or a condensate of the compound represented by formula (1) below and formaldehyde,

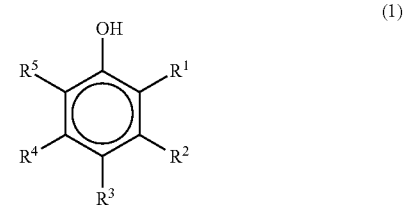

wherein $R^1$, $R^2$, $R^3$, $R^4$ and $R^5$ are hydrogen, a hydroxyl group or an alkyl group having from 1 to 8 carbons.

13. The method for manufacturing a pneumatic tire according to claim 1, further comprising forming the end of the laminate body diagonally so that an end of the laminate body in the circumferential direction inclines at an angle of from 10° and 85° relative to a tire circumferential direction; and molding the pneumatic tire with the inclined angle of the end of the laminate body.

14. The method for manufacturing a pneumatic tire according to claim 1, wherein a band-like member is applied on an outer periphery of the sheet member (B) so as to cover a joint portion of the starting end of winding and ending end of winding of the sheet member (B), and a tensile stress at a time of 20% elongation at 25° C. of a material (c) constituting the band-like member is from 1 to 3 times a tensile stress at a time of 20% elongation at 25° C. of the material (a).

15. The method for manufacturing a pneumatic tire according to claim 1, wherein the molding drum has a mechanism for adhering the sheet member (A) to a portion of a drum surface.

16. The method for manufacturing a pneumatic tire according to claim 1, wherein the joint portion of the laminate body and a joint portion of the carcass layer overlap in the radial direction when the laminate body is wound on the molding drum and the carcass layer is wound on the outer periphery of the laminate body.

17. The method for manufacturing a pneumatic tire according to claim 1, wherein after the sheet member (A) undergoes biaxially oriented processing, the sheet member (B) is layered on the outer periphery of the sheet member (A).

18. A pneumatic tire obtained by the method for manufacturing a pneumatic tire described in claim 1.

* * * * *